July 8, 1958  M. C. SYLWAN  2,841,918
BEARING ASSEMBLY FOR BUILDING SETS
Original Filed Feb. 18, 1952
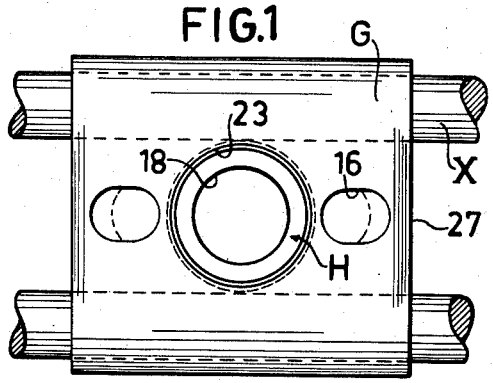
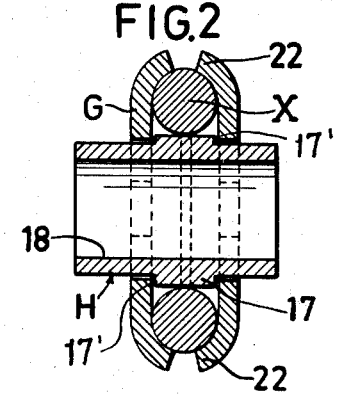
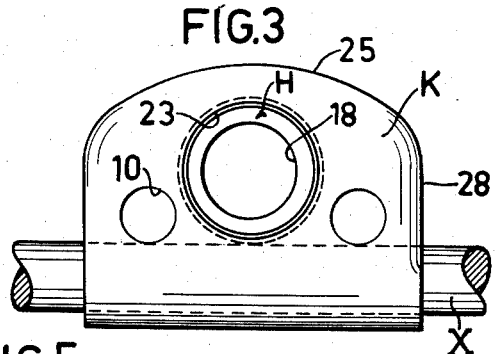
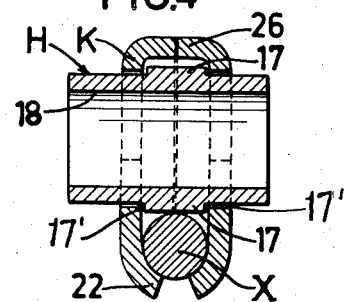
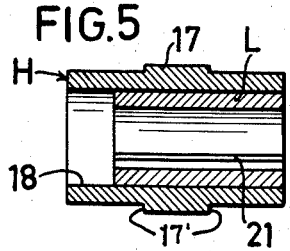
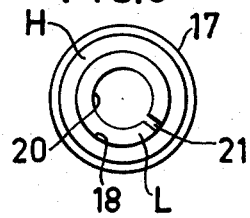
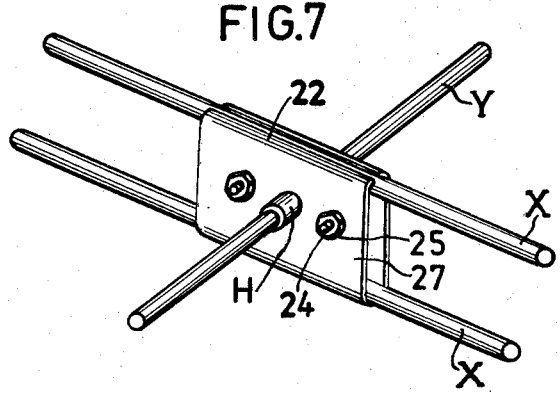
INVENTOR.
M. C. Sylwan
BY
Glascock Downing Seebold
ATTYS.

United States Patent Office 2,841,918
Patented July 8, 1958

2,841,918
BEARING ASSEMBLY FOR BUILDING SETS

Mark Christopher Sylwan, Hagersten, Sweden

Original application February 18, 1952, Serial No. 272,118. Divided and this application January 26, 1956, Serial No. 561,633

8 Claims. (Cl. 46—29)

This invention relates to bearing assemblies belonging to such building sets which comprise elongated structural members of cylindrical shape intended to be joined together in spaced parallel relationship to form structures of various kinds.

One object of the invention is the provision of bearing assemblies which readily lend themselves for incorporating in structures comprising cylindrical structural members having an established parallel relationship which may be attained by the use of clamping members of known or suitable shape.

Another object is the provision of bearing assemblies which serve themselves as the means for establishing a spaced parallel relationship between cylindrical structural members, and which may at the same time provide bearings for axles or shafts which extend at right angles to the said structural members.

In the accompanying drawings, in which are illustrated two of the various possible embodiments of the invention, Fig. 1 is an elevation view of a bearing assembly adapted to be secured to two parallel structural members, Fig. 2 is a cross section view through the bearing assembly in Fig. 1, Fig. 3 is an elevational view of a bearing assembly adapted for clamping to one single structural member, Fig. 4 is a cross section view of the bearing assembly in Fig. 3, Fig. 5 is a longitudinal section through a bearing bush with an interior sleeve, Fig. 6 is an end view of the bush and sleeve in Fig. 5, Fig. 7 is a perspective view of the bearing assembly in Figs. 1 and 2.

In Figs. 1, 2, and 7 there is illustrated a bearing assembly comprising two identically alike clamping plates G, two opposite edge portions 22 of which are curled after an arc of a circle, the plates G thus each being shaped as a shallow trough.

Along the central axis of each plate G there are three holes, one central hole or aperture 23 and an additional and smaller hole 16 symmetrically at each side thereof. The additional apertures or holes 16 may be circular or somewhat elongated to allow for adjustment as illustrated in Fig. 1, and serve for receiving clamping screws 24 provided with nuts 25 (Fig. 7).

The plate members G are adapted to be clamped together in pairs across structural members such as cylindrical rods or tubes X as shown in Figs. 1, 2, and 7. The curvature of the curled edge portions 22 is such that those portions conform to the shape of the rods X and provide lateral abutments for the latter to prevent the rods to be forced apart. The curled portions do not meet when separated by a rod X, but leave a free space therebetween. The end portions 27 of plate members G are bent down and recessed at both ends to accommodate rods X which will thus be prevented from coming closer together or from losing their parallel relationship. Further the bent portions 27 serve to stiffen the plate members G additionally.

The dimensions of the clamping plate members are such that the distance between the opposite ends of the bent portions 27 disposes the rods X a distance such that the distance between the centers of the rods is equal to the distance between the centers of circles the arcs of which form the inner ends of holes 16 when they are elongated as shown or equal to the distance between the centers of such holes when they are circular as indicated in dotted lines of Figure 1. This spacing permits assembling other rods, not shown, having the same external diameter as rods X but having reduced threaded ends disposable in holes 16 so that suitable nuts as at 25 can secure such other rods in position and clamp the plate members G together. With this arrangement all rods are the same distance apart to maintain symmetry in construction.

The plates G are aadpted to accommodate a bearing bush H. The bush H has a length that is longer than the thickness of two assembled plate members G. Further, the bush has a smooth internal cylindrical bore 18 and an enlarged central portion 17 extending between spaced shoulders 17'. The distance between the shoulders is less than the distance between the facing inner surfaces of plates G so that when mounting the bushing in place a limited axial adjustment of the bush is permitted. The opposite end portions of the bush that extend beyond the enlarged portion 17 protrude beyond the respective plates G when the plates are assembled over the bush. While the drawing indicates that the diameter of holes 23 in plates G is slightly larger than the outer diameter of the protruding end portions of the bush so that a slight clearance space exists, such arrangement is not a more restrictive showing since the ends of the bush can have tight or friction fit within holes 23. In any event, the bush is substantially fixed against turning. In the illustrated form rods X grip the exterior of the enlarged portion 17.

The bearing bush H is used for journaling an axle or shaft Y (Fig. 7). The bore 18 of bush H may be of any desired diameter, and may be modified for receiving a shaft of less diameter by inserting an inner sleeve L of suitable dimensions therein as illustrated in Fig. 5. The sleeve L has a smooth cylindrical shape, and it is made resilient by a longitudinal slit 21 so that it may be readily inserted into the bore 18 and is retained therein by its springiness.

Bearing assemblies as illustrated in Figs. 1, 2, and 7 may be readily incorporated in structures comprising spaced parallel structural members such as rods X provided the distance between said members is suitable. If it should be impracticable, however, to dispose rods with the proper spacing, or if only one rod should be available for the mounting of a bearing assembly an embodiment as illustrated in Figs. 3 and 4 may be used. The plate members K are shaped substantially like the members G along one edge 22, i. e. that edge is curled to fit against the circumference of a cylindrical rod X, and there are holes 10 for receiving clamping screws. The opposite edge 25 has a more or less curve-like contour, and its rim portion 26 is bent at right angles, so that two plate members K with a rod X interposed along their edge portions 22 abut each other with the opposite portions 26.

The plate members K each have a hole 23 which is offset from the center-line passing through the holes 10. The holes 23 are adapted to receive a bearing bush H in exactly the same manner as are plate members G illustrated in Figs. 1, 2, and 7. The spacing between the holes 10 is twice that between the hole 23 and a rod X when in position.

A sleeve L may be inserted in the bush H also in this embodiment, to adapt the bearing for shafts having a smaller diameter.

Similarly to plate members G also plate members K are shaped with bent-down end portions, designated 28. These end portions act to stiffen the plate member, and are recessed at one end for accommodating a rod X between themselves and the curled edge portion 22. The lateral locking of the rod X will thus be determined by the shape of the clamping plates themselves, and will be independent of the clamping effort exercised on the clamping screws and nuts. The same applies, of course, to the clamping plates G.

It is to be understood that the structural members to which the bearing assemblies as described above are clamped may belong to any structure which has been assembled by the use of known or suitable other clamping members. The bearing assemblies according to the invention will form a valuable improvement of building sets incorporating cylindrical structural members, and will in certain embodiments serve as clamping members themselves which are adapted to connect such cylindrical structural members in spaced parallel relationship. In such case the bearing bushes may, of course, be left aside.

This application is a division of application Serial No. 272,118, now abandoned.

What I claim is:

1. In a set of constructional elements including at least one elongated cylindrical structural member, a bearing assembly comprising in combination two substantially flat, similar, clamping sheet members disposed in facing relation and including surfaces adapted to accommodate and grip said cylindrical structural member therebetween and to maintain the same in a predetermined position, extending parallel to the plane of the sheet members, means for releasably clamping said sheet members together in opposed relation with said cylindrical member interposed therebetween, each clamping member having an aperture therethrough, a bearing bush having an enlarged middle portion and reduced end portions, the apertures in the sheet members being in alignment when said members are in opposed relation, said enlarged middle portion of the bush having a greater transverse dimension than the apertures and less axial extent than the distance between the facing inner surfaces of the sheet members so as to permit limited axial adjustment of the bush relative to the plane of the clamping sheet members, each said clamping sheet member having one edge portion bent to define a trough so that when in opposed relation the trough of the respective sheet members surround and conform with at least a portion of the periphery of said cylindrical structural member, said troughs extending completely along one edge of each sheet member and said clamping sheet members each having additional apertures therethrough in alignment when the members are in opposed relation, and the means for releasably clamping such sheet members together about a cylindrical structural member including threaded means disposed through the said aligned additional apertures of opposed sheet members and nut means cooperable with the threaded means.

2. In a set of constructional elements including at least one elongated cylindrical structural member, a bearing assembly comprising in combination two substantially flat, similar, clamping sheet members disposed in facing relation and including surfaces adapted to accommodate and grip said cylindrical structural member therebetween and to maintain the same in a predetermined position, extending parallel to the plane of the sheet members, means for releasably clamping said sheet members together in opposed relation with said cylindrical member interposed therebetween, each clamping member having an aperture therethrough, a bearing bush having an enlarged middle portion and reduced end portions, the apertures in the sheet members being in alignment when said members are in opposed relation, said enlarged middle portion of the bush having a greater transverse dimension than the apertures and less axial extent than the distance between the facing inner surfaces of the sheet members so as to permit limited axial adjustment of the bush relative to the plane of the clamping sheet members, each said clamping sheet member having one edge bent to define a trough portion conforming to at least part of the periphery of said cylindrical structural member when said clamping sheet members are in opposed relation with said cylindrical member theretbetween, each said clamping sheet member having another edge portion bent at substantially right angles to the plane of the sheet members to constitute an abutment, the abutments of the respective sheet members cooperating to space the clamping members apart, said clamping members further having additional apertures therethrough in alignment when the clamping members are in opposed relation, and the means for releasably clamping the sheet members together including threaded means disposed through said aligned additional apertures and nut means for cooperation with said threaded means.

3. In a set of constructional elements including elongated cylindrical elements, a combined connecting means and bearing assembly comprising a pair of similar sheet members having substantially flat external faces and opposed pairs of edges, at least one edge of each sheet member being bent toward the other sheet member to provide an internal seating surface to accommodate a cylindrical element between the sheet members with the cylindrical element extending parallel to said edge, the edge of each sheet member extending toward said first mentioned edges being recessed adjacent said first mentioned edges and bent toward one another so that the recesses accommodate a cylindrical element and said second mentioned edges helping to rigidify the sheet members in opposite relationship, each sheet member having an aperture therethrough, said apertures being in alignment when the sheet members are in opposed relation, a bearing bush adapted for accommodation in said apertures, said bush having an internal bore therethrough and an enlarged portion intermediate its ends having an external diameter larger than the diameter of the aperture in each sheet member, said enlarged portion terminating in axially spaced shoulders, said shoulders being spaced apart a distance less than the space between the inner facing surfaces of said sheet members, so that said bush can be axially adjusted to a limited extent between said sheet members, and means for clamping said sheet members together in opposed relation to maintain said cylindrical element in a predetermined position and to secure said bush against withdrawal from said sheet members.

4. In a set of constructional elements a clamping member comprising a generally flat four edged sheet member, two opposed edge portions of said sheet member being bent relative to the plane of the sheet member to define a trough extending parallel to said edge portions throughout the extent thereof for accommodating a cylindrical rod, the other two edges of said sheet member being bent in the same direction as said first mentioned edge portions and having an extent less than the distance between said troughs to define recesses for accommodating the periphery of a rod, said sheet member having apertures therethrough and means including threaded components for cooperation with at least some of said apertures whereby assembly of two such sheet members in opposed relation with cylindrical rods in the troughs clamps the rods in parallelism.

5. A clamping member as claimed in claim 4, and the apertures in said sheet member including two apertures having arcuate edges about centers on a line parallel to said troughs and said centers being spaced apart a distance equal to the distance between the centers of clamped rods.

6. A clamping member as claimed in claim 5 and said apertures including a central aperture in said sheet member, larger than the other apertures and adapted to accommodate a bush member.

7. A clamping member for constructional sets comprising a generally flat four edged sheet member, one of said edges being curved in plan and including a rim portion bent at substantially right angles to the plane of the sheet member, the opposite edge of said sheet member being transversely bent along an arc of a circle and the two remaining edges of the sheet member being bent at substantially right angles to the plane of the sheet member and in the same direction as said rim and having recesses adjacent the ends adjoining said edge that is transversely bent along an arc of a circle so as to accommodate the periphery of a rod, the central portion of said sheet member having an aperture therethrough adapted to receive a bearing member, said sheet member having additional apertures lying on a line parallel with the edge that is transversely bent along the arc of a circle, said apertures having arcuate edges defined by arcs of circles the distance between the centers of which is twice the distance between the axis of a rod accommodated by said curved edge and the center of the aperture in the central portion of said sheet member.

8. In a set of constructional elements, a pair of cylindrical rod members, a pair of similarly formed oppositely facing combined clamping and shaft assembly supporting members, said last mentioned members each comprising sheet members having substantially flat outer faces and opposed pairs of edges, opposite edges of each member being bent along an arc of a circle extending transversely of said faces so as to define spaced parallel troughs extending completely along said edges to accommodate said rod members, the remaining edges being shorter than the distance between the periphery of said rod members and being recessed at opposite ends and bent at substantially a right angle to said faces so as to partially encompass said rods and help rigidify said members, each member having a similarly formed aperture in the middle thereof, a bearing bush means having an enlarged middle portion and opposite ends protruding beyond said apertures, said enlarged middle portion having a transverse dimension greater than the apertures and an axial extent less than the distance between the inner faces of the sheet members so as to permit limited axial adjustment of said bush members, a shaft journalled in said bush member, and threaded means clamping the sheet members and rod members in assembled relation.

References Cited in the file of this patent

UNITED STATES PATENTS

| | | |
|---|---|---|
| 82,738 | Moorehead | Oct. 6, 1868 |
| 693,206 | Wyckoff | Feb. 11, 1902 |
| 750,153 | Bechtol et al. | Jan. 19, 1904 |
| 1,177,665 | Watson | Apr. 4, 1916 |
| 1,843,115 | Ferris | Feb. 2, 1932 |
| 2,280,361 | Ackerman | Apr. 21, 1942 |
| 2,402,570 | O'Donnell | June 25, 1946 |
| 2,559,975 | Lange et al. | July 10, 1951 |
| 2,658,776 | Wilcox | Nov. 10, 1953 |
| 2,715,537 | Hofheimer | Aug. 16, 1955 |

FOREIGN PATENTS

| | | |
|---|---|---|
| 359,933 | Germany | Sept. 28, 1922 |